United States Patent Office 2,694,619
Patented Nov. 16, 1954

2,694,619

PRODUCTION OF HYDROGEN SULFIDE

Colbert William Wilkins, Jacksonville Beach, Fla., assignor to National Container Corp., Jacksonville, Fla., a corporation of Florida No Drawing. Application April 25, 1951, Serial No. 222,929

20 Claims. (Cl. 23—181)

The present invention relates to a method for producing hydrogen sulfide, and in particular to a method for accelerating the production of hydrogen sulfide by the reaction between an alkaline earth oxide, sulfur and water at an elevated temperature.

In the manufacture of wood pulp from wood, wood chips are usually caused to react with a bath of cooking liquor which includes sodium sulfide and sodium hydroxide. In the process of reclaiming this liquor after it has been used and reconditioning it for subsequent use, the discovery of the most economical method for maintaining and replenishing the sulfur content or sulfidity of the bath has proved extremely troublesome. In a copending application by myself and Robert Howard Stevens, entitled "Reclaiming of Wood Pulp Cooking Liquor Through the Use of Hydrogen Sulfide," Serial No. 222,902, and filed of even date herewith, a novel reclaiming method is disclosed and claimed which involves the addition of hydrogen sulfide to the liquor being reclaimed in order at least in part to replenish its sulfur content.

The production of paper pulp is carried out on a very large scale and in a continuous manner, many mills operating on a seven-day per week schedule. Thus the quantities of chemicals consumed are quite appreciable, and the cost of the chemicals which must be used is an exceedingly important factor in the overall cost of production. Moreover, because of the large scale on which these processes are carried out, the production of hydrogen sulfide, in order to be practically useable, must be sufficiently rapid as to assure a supply of that compound adequate for the maximum rate of paper pulp production of a given mill, and with the use of a minimal amount of equipment.

Lynn et al. Patent No. 1,862,900 of June 14, 1932, reissued as Re. 18,902, discloses a method of production of hydrogen sulfide which involves the reaction between elemental sulfur and an alkali such as sodium hydroxide at high temperatures and in the presence of water. This reaction will satisfy the second criterion set forth above in that the rate of production of hydrogen sulfide is adequate. Moreover, the cost of elemental sulfur is sufficiently small so that, viewed from that point of view alone, the process is economically feasible. However, the cost of sodium hydroxide or other comparable alkali is so great that, when sufficient sodium hydroxide is employed to produce the amounts of hydrogen sulfide required by even the most efficiently operated pulp mill, the cost of production of the hydrogen sulfide greatly exceeds the cost of the bath reclaiming methods which have previously been used.

It is standard in these reclaiming methods to utilize lime (calcium oxide) to slake the partially recovered bath. Lime is an exceptionally effective substance from a chemical point of view, and in this reaction has the inestimable economic advantage of being almost entirely recoverable, the insoluble calcium carbonate which results from the slaking operation being burned in a kiln so as to regenerate calcium oxide in a form which may be reused without difficulty.

I have found that calcium oxide and the oxides of the other metals of the alkaline earth group will also react with sulfur and water at high temperatures in order to generate hydrogen sulfide. The predominant by-product of this reaction, apparently calcium sulfite, will be converted to recoverable calcium carbonate by reactions inherent in the normal procedure of cooking liquor recovery, and that calcium carbonate may then be burned and reconverted into active calcium oxide which can be reused. Moreover, the standard recovery steps result in the ultimate conversion of the sodium sulfite to sodium sulfide, so that the full amount of sulfur used in the production of hydrogen sulfide eventually is utilized in raising the sulfidity of the cooking liquor.

Thus, from an economic point of view, the reaction between calcium oxide and sulfur in the formation of hydrogen sulfide is greatly to be preferred over the use of sodium hydroxide instead of calcium oxide, both because lime is less expensive than sodium hydroxide and because the lime may be almost completely recovered, only sulfur being consumed.

However, the reaction between calcium oxide, sulfur and water under the conditions set forth is much too slow for industrial use where large quantities of hydrogen sulfide are required. At temperatures of between 385° F. to 440° F., which temperatures have proved most feasible from a commercial point of view for the carrying out of the above reaction, it takes between 4 and 8 hours to generate as much as one-half of the theoretically available amount of hydrogen sulfide. This rate of production is much too slow, and, in actual industrial practice, would require so many simultaneously reacting mixes as to make the capital cost of equipment entirely too high, in addition to materially limiting the necessary flexibility of operation.

I have discovered that the addition of but a small amount of sodium hydroxide or a hydroxide of one of the other members of the alkali group to the mixture of alkaline earth metal oxide, sulfur and water will speed up the overall reaction to such an extent that, instead of requiring 4 to 8 hours to produce one-half the theoretical amount of hydrogen sulfide, a full theoretical yield can be produced in between 15 to 30 minutes. The sodium hydroxide apparently does not act as a catalyst, because it appears to be consumed in the reaction, but the amounts in which the sodium hydroxide is used are so small in comparison with the amounts of lime and sulfur that the products formed directly from sodium hydroxide do not themselves constitute any appreciable portion of the total yield. The sodium hydroxide therefore seems to act as an accelerator.

Because only a small amount of sodium hydroxide is employed, that substance preferably being present in proportions less than 10% by weight of the entire reacting mixture, the cost of the sodium hydroxide consumed does not loom large in the overall cost of production of the hydrogen sulfide, and consequently the economic advantages attendant upon the use of calcium oxide as the major reactant with the sulfur prevail will dominate. Indeed, excellent results have been obtained when as little as approximately 2% by weight of sodium hydroxide are employed.

As a specific example of the accelerating effect exhibited by sodium hydroxide in this process a mixture of lime and sulfur having a mol ratio of 1:4 (56 parts by weight of active calcium oxide (about 70 parts by weight of commercial lime of 80% activity) mixed with 128 parts by weight of sulfur) may be employed, and water, in the form of steam, is added in an amount approximately 50% in excess of that theoretically required to combine with the sulfur to form hydrogen sulfide. When these ingredients are reacted in a steam jacketed container at a temperature of between 380° F. and 440° F., and under a pressure of between 300 and 400 lbs. per sq. in. gauge, it takes from 4 to 8 hours to obtain approximately one-half the theoretical amount of hydrogen sulfide. A reaction using identical products and proportions and under the same conditions, but with sodium hydroxide added to the extent of 1% of the total dry reaction mass, exhibits an increase in the rate of production of hydrogen sulfide. When a similar reaction is carried out in the presence of approximately 2% by weight of sodium hydroxide, 80 to 90% of the theoretical yield of hydrogen sulfide is obtained in between 15 minutes and one-half hour. As the percentage of sodium hydroxide is increased the rate of yield of hydrogen sulfide increases markedly, so much so that when 10% of sodium hydroxide is employed the pressure within the reaction container increases rapidly to 600 lbs. per sq. in. gauge, and the relief valve must be opened in order to avoid an explosion unless special high pressure equipment is employed.

The mol ratio of lime to sulfur above set forth is by no means critical and may be varied widely. In some experiments the mol ratio has been as low as 1:2.6, that is to say, 56 parts by weight of active calcium oxide to 83.2 parts of sulfur with 78.4 parts of water. The rate of formation of hydrogen sulfide from this mixture was comparable to that set forth above, and when 2% by weight of sodium hydroxide was added to the mixture, practically 100% of the theoretical yield of hydrogen sulfide was generated within 30 minutes.

The ranges of temperature and pressure under which the above reaction takes place may also be comparatively widely varied. A temperature of 380° F. and a pressure of 400 lbs. per sq. in. will produce effective evolution of hydrogen sulfide, but best rates of formation in the experiments carried out by us were found to occur when the temperature was 400° F. or higher, and at a somewhat lower pressure, as between 300 and 350 lbs. per sq. in. gauge.

In place of calcium oxide, the oxides of other metals of the alkaline earth group, such as barium oxide, strontium oxide and magnesium oxide, could also be employed. However, as set forth above, calcium oxide is preferred because it is less costly than the other oxides mentioned, because it can be readily reconverted to active calcium oxide without any appreciable loss, and because it is already used in the reclaiming of the cooking liquor in the paper pulp process. This last advantage is of significance only when the hydrogen sulfide is to be used in such a process, or in some other process where calcium oxide is already employed, but the other advantages are of more general application.

The amount of sodium hydroxide to be added as an accelerating agent may also be expressed in terms of the amount of sulphur used, the optimum proportions being between 3% and 7% by weight thereof.

In place of sodium hydroxide, potassium hydroxide could also be employed. No difference in the accelerative effect of potassium hydroxide when compared with sodium hydroxide has been detected. Ammonium hydroxide might also be employed, but the high temperature needed for the lime-sulfur-water reaction would involve enormous pressures if ammonium hydroxide of sufficient concentration were present. The capital investment involved in equipment which would withstand such pressures would be prohibitive. Sodium hydroxide is preferred to potassium hydroxide primarily because the latter is much more expensive. However, where expense is not a factor, the two may be used interchangeably.

It will be understood that while calcium oxide and alkaline earth metal oxides are here referred to, the corresponding hydroxides may be used, as well as compounds which will, upon introduction into the reacting mixture, produce those substances, and similarly while specific reference is made to hydroxides of the alkali group, one may also employ substances, such as oxides and salts, which upon introduction into the mixture will produce such hydroxides.

The reason why the addition of small amounts of sodium hydroxides or other alkali hydroxides has this marked accelerative effect on the reaction between an alkaline earth oxide and sulfur in the presence of water is not known, and this invention should be therefore considered as an empirical one. The fact remains that the lime-sulfur-water reaction, while economically and theoretically feasible, is not commercially practical because of its low rate of generation of hydrogen sulfide, but by the addition thereto of economically inappreciable amounts of sodium hydroxide, which amounts are sufficiently small so as not to contribute directly in any substantial degree to the total production of hydrogen sulfide, the rate of reaction of the lime, sulfur and water is so markedly stepped up that the reaction time is cut over forty-fold. In this way the use of inexpensive, available and reclaimable constituents is permitted without sacrifice of productive efficiency and without requiring the large capital outlay that would be necessary for numerous reaction chambers if a low rate of production would have to be tolerated.

The method in question has been here specifically disclosed with reference to its desirability for use in the production of wood pulp. However, it is of significant importance in any application where the expeditious generation of hydrogen sulfide is desired. Those aspects of the present invention which relate specifically to the production of paper pulp are dealt with in the co-pending application mentioned above. The broader aspects of the invention, as applied directly to the production of hydrogen sulfide, and apart from the use which is made of the hydrogen sulfide, are claimed in this application. It will be understood that the examples here set forth are by way of illustration only, and that variations may be practiced in the method, and particularly in the temperatures and pressures employed and the specific proportions of reactants, without departing from the spirit of my invention as defined in the following claims.

I claim:

1. The method of rapidly generating hydrogen sulfide which comprises reacting a member of the group consisting of alkaline earth metal oxides and hydroxides with sulphur and water at an elevated temperature and pressure, and adding thereto, as an accelerating agent, an amount between 1 and 10% by weight of the total dry reactants of a member of the group consisting of the hydroxides of sodium and potassium and mixtures thereof.

2. The method of rapidly generating hydrogen sulfide which comprises reacting a member of the group consisting of alkaline earth metal oxides and hydroxides with sulphur and water at an elevated temperature and pressure, and adding thereto, as an accelerating agent, an amount between 1 and 10% by weight of the total dry reactants of sodium hydroxide.

3. The method of rapidly generating hydrogen sulfide which comprises reacting a member of the group consisting of alkaline earth metal oxides and hydroxides with sulphur and water at an elevated temperature and pressure, and adding thereto, as an accelerating agent, an amount between 1 and 10% by weight of the total dry reactants of potassium hydroxide.

4. The method of rapidly generating hydrogen sulfide which comprises reacting calcium oxide with sulphur and water at an elevated temperature and pressure, and adding thereto, as an accelerating agent, an amount between 1 and 10% by weight of the total dry reactants of a member of the group consisting of the hydroxides of sodium and potassium and mixtures thereof.

5. The method of rapidly generating hydrogen sulfide which comprises reacting calcium oxide with sulphur and water at an elevated temperature and pressure, and adding thereto, as an accelerating agent, an amount between 1 and 10% by weight of the total dry reactants of sodium hydroxide.

6. The method of rapidly generating hydrogen sulfide which comprises reacting calcium oxide with sulphur and water at an elevated temperature and pressure, and adding thereto, as an accelerating agent, an amount between 1 and 10% by weight of the total dry reactants of potassium hydroxide.

7. The method of rapidly generating hydrogen sulfide which comprises reacting a member of the group consisting of alkaline earth metal oxides and hydroxides with sulphur and water at an elevated temperature and pressure and adding thereto, as an accelerating agent, approximately 2% by weight of the total dry reactants of a member of the group consisting of the hydroxides of sodium and potassium and mixtures thereof.

8. The method of rapidly generating hydrogen sulfide which comprises reacting a member of the group consisting of alkaline earth metal oxides and hydroxides with sulphur and water at an elevated temperature and pressure, and adding thereto, as an accelerating agent, approximately 2% by weight of the total dry reactants of sodium hydroxide.

9. The method of rapidly generating hydrogen sulfide which comprises reacting calcium oxide with sulphur and water at an elevated temperature and pressure, and adding thereto, as an accelerating agent, approximately 2% by weight of the total dry reactants of a member of the group consisting of the hydroxides of sodium and potassium and mixtures thereof.

10. The method of rapidly generating hydrogen sulfide which comprises reacting calcium oxide with sulphur and water at an elevated temperature and pressure, and adding thereto, as an accelerating agent, approximately 2% by weight of the total dry reactants of sodium hydroxide.

11. The method of rapidly generating hydrogen sulfide which comprises reacting calcium oxide with sulphur in the presence of water at an elevated temperature and pressure, the calcium oxide and sulphur being present in a mol ratio of between 1:4 and 1:2.6, and adding thereto, as an accelerating agent, a member of the group consisting of the hydroxides of sodium and potassium and mixtures thereof in an amount between 1% and 10% by weight of the total dry reactants.

12. The method of rapidly generating hydrogen sulfide which comprises reacting calcium oxide with sulphur in the presence of water at an elevated temperature and pressure, the calcium oxide and sulphur being present in a mol ratio of between 1:4 and 1:2.6, and adding thereto, as an accelerating agent, sodium hydroxide in an amount between 1% and 10% by weight of the total dry reactants.

13. The method of rapidly generating hydrogen sulfide which comprises reacting calcium oxide with sulphur in the presence of water at an elevated temperature and pressure, the calcium oxide and sulphur being present in a mol ratio of between 1:4 and 1:2.6, and adding thereto, as an accelerating agent, a member of the group consisting of the hydroxides of sodium and potassium and mixtures thereof in an amount on the order of a magnitude of 2% by weight of the total dry reactants.

14. The method of rapidly generating hydrogen sulfide which comprises reacting calcium oxide with sulphur in the presence of water at an elevated temperature and pressure, the calcium oxide and sulphur being present in a mol ratio of between 1:4 and 1:2.6, and adding thereto, as an accelerating agent, sodium hydroxide in an amount on the order of magnitude of 2% by weight of the total dry reactants.

15. The method of rapidly generating hydrogen sulfide which comprises reacting a member of the group consisting of alkaline earth metal oxides and hydroxides with sulphur and water at an elevated temperature on the order of 300° F. and at an elevated pressure many times higher than atmospheric pressure, and adding thereto, as an accelerating agent, an amount between 1 and 10% by weight of the total dry reactants of a member of the group consisting of the hydroxides of sodium and potassium and mixtures thereof.

16. The method of rapidly generating hydrogen sulfide which comprises reacting a member of the group consisting of alkaline earth metal oxides and hydroxides with sulphur and water at an elevated temperature on the order of 300° F. and at an elevated pressure many times higher than atmospheric pressure, and adding thereto, as an accelerating agent, an amount between 1 and 10% by weight of the total dry reactants of sodium hydroxide.

17. The method of rapidly generating hydrogen sulfide which comprises reacting a member of the group consisting of alkaline earth metal oxides and hydroxides with sulphur and water at an elevated temperature on the order of 300° F. and at an elevated pressure many times higher than atmospheric pressure, and adding thereto, as an accelerating agent, an amount between 1 and 10% by weight of the total dry reactants of potassium hydroxide.

18. The method of rapidly generating hydrogen sulfide which comprises reacting calcium oxide with sulphur and water at an elevated temperature on the order of 300° F. and at an elevated pressure many times higher than atmospheric pressure, and adding thereto, as an accelerating agent, an amount between 1 and 10% by weight of the total dry reactants of a member of the group consisting of the hydroxides of sodium and potassium and mixtures thereof.

19. The method of rapidly generating hydrogen sulfide which comprises reacting a member of the group consisting of alkaline earth metal oxides and hydroxides with sulphur and water at an elevated temperature on the order of 300° F. and at an elevated pressure many times higher than atmospheric pressure, and adding thereto, as an accelerating agent, approximately 2% by weight of the total dry reactants of a member of the group consisting of the hydroxides of sodium and potassium and mixtures thereof.

20. The method of rapidly generating hydrogen sulfide which comprises reacting calcium oxide with sulphur in the presence of water at an elevated temperature on the order of 300° F. and at an elevated pressure many times higher than atmospheric pressure, the calcium oxide and sulphur being present in a mole ratio of between 1:4 and 1:2.6, and adding thereto, as an accelerating agent, a member of the group consisting of the hydroxides of sodium and potassium and mixtures thereof in an amount between 1% and 10% by weight of the total dry reactants.

References Cited in the file of this patent

UNITED STATES PATENTS

| Number | Name | Date |
| --- | --- | --- |
| 1,862,900 | Lynn et al. | June 14, 1932 |